Feb. 9, 1971   W. J. ADAMS, JR   3,561,159
SEED CAPSULE AND METHOD OF MAKING SAME
Filed May 1, 1968
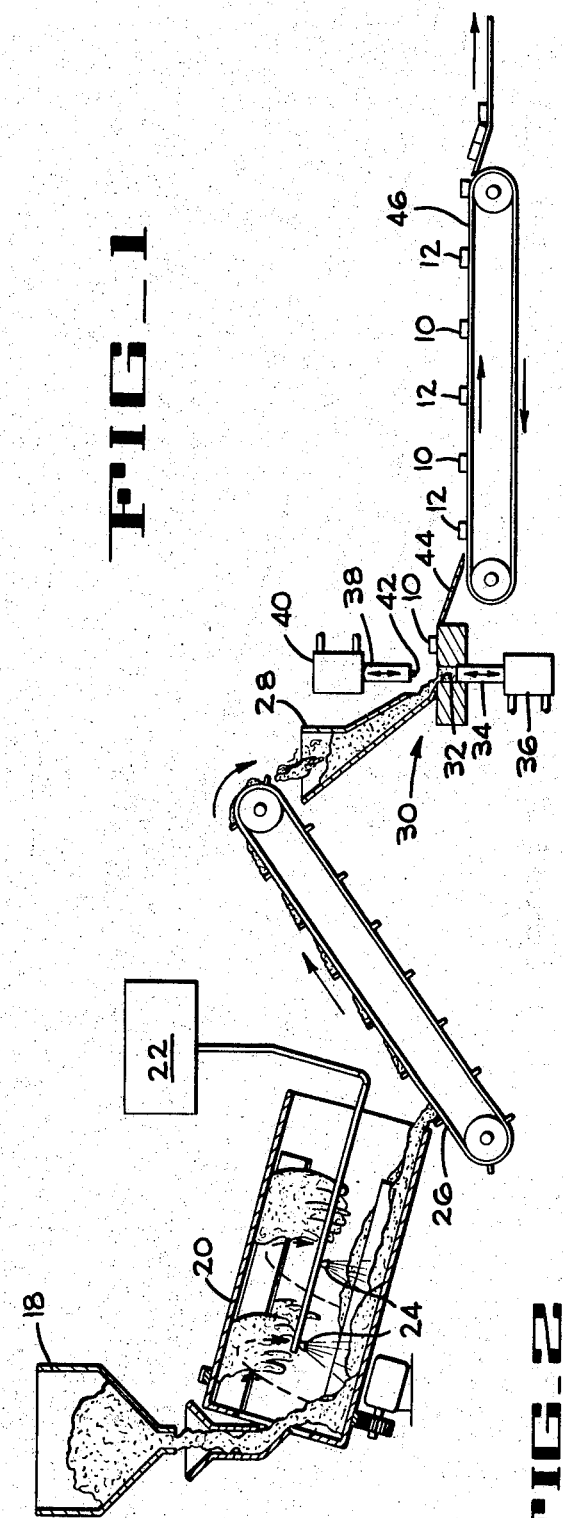
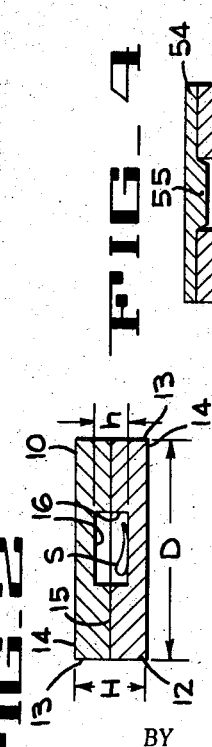
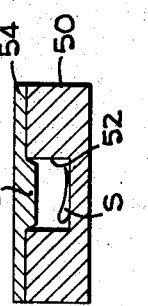
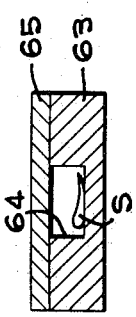
INVENTOR.
WILLIAM J. ADAMS, JR.
BY F. W. Anderson
C. E. Tripp
ATTORNEYS United States Patent Office 3,561,159
Patented Feb. 9, 1971

3,561,159
SEED CAPSULE AND METHOD OF MAKING SAME
William J. Adams, Jr., San Jose, Calif., assignor to FMC Corporation, San Jose, Calif., a corporation of Delaware
Filed May 1, 1968, Ser. No. 725,688
Int. Cl. A01c 1/06
U.S. Cl. 47—57.6                          5 Claims

ABSTRACT OF THE DISCLOSURE

Seed capsules are formed by preparing a charge of seed bed materials, such as vermiculite and binder, compressing the charge to form a base capsule segment having a recess therein, drying the base segment, placing a seed in the recess, and closing the recess to form a seed-containing cavity by securing to the base a cover that has been prepared in the same manner as the base, or by securing a sheet or strip member of paper or plastic to the base.

BACKGROUND OF THE INVENTION

This invention relates to the germination of seeds, and more particularly concerns an improved capsule in which a seed is carried and to an improved method of preparing seed capsules.

DESCRIPTION OF THE PRIOR ART

Various coverings have been proposed for seeds in order to increase germination or to make the planting of the seeds easier and more efficient. The patents to Vogelsang No. 2,502,809, Hodges No. 1,645,001, Clawson No. 2,785,969, Scott No. 2,967,376, Tukacs No. 3,077,700, Eversole No. 3,113,399, and Legal et al. No. 3,316,676 disclose various protective coatings for seed and various mixes in which the seed may be embedded. It has also been proposed to prepare a mix of vermiculite and a binder, such as polyvinyl acetate, embed a seed in the mix, and compress the mix to form a seed pellet.

SUMMARY OF THE PRESENT INVENTION

The present invention is concerned with the preparation of a seed capsule in such a manner that the capsule is strong enough to withstand the action of machinery used to handle, store and plant the capsule, and has a seed contained therein that is in no way detrimentally affected by the formation of such a durable capsule.

In general, the method of the present invention involves the concept of separately preparing each element of a two piece capsule using the pressure necessary to make durable capsule members, forming a recess in one or both of the elements during the preparation, placing a seed in the recess of one element of the capsule, and securing the other capsule element to the seed-containing element to enclose the seed in the cavity defined in the capsule. Preferably, the capsule body is heated after forming, but before the seed is added, to reduce the moisture to equilibrium levels. Since all the pressurizing and heating operations are concluded before the seed is put into contact with the capsule, the seed is not adversely affected by the pressure or heat applied to, or the moisture in, the initial mix. The seed containing cavity contains sufficient oxygen for germination and growth of the seed. The capsule preferably is made of a mixture of exfoliated vermiculite with a polyvinyl acetate binder.

It is therefore an object of the present invention to provide a method of making seed capsules without subjecting the seed to the forces of compression and heat which might damage the seed.

Another object is to provide a method of making a seed capsule from a mix of vermiculite and a binder without subjecting the seed to the action of the moisture in the mix.

Another object is to provide a seed capsule in which space is provided around the seed to provide the oxygen of the air necessary for germination and growth.

Other and further objects and advantages of the present invention will be apparent from the following specification taken in connection with the accompanying drawings of preferred embodiments.

DESCRIPTION OF THE DRAWINGS

FIG. 1 is a diagrammatic showing of an apparatus in which the method of the present invention may be practiced to produce the improved seed capsule of the present invention.

FIGS. 2–7 are sections taken through six separate embodiments of the seed capsule of the present invention.

DESCRIPTION OF THE PREFERRED EMBODIMENTS

The embodiment of the capsule of the present invention illustrated in FIG. 2 comprises two identically-shaped members 10 and 12 secured together by an adhesive. Each of these members is generally cylindrical in configuration, having a cylindrical outer wall 13, a flat outer end wall 14, and a flat circular inner end wall 15 with a cylindrical recess 16 therein.

Apparatus for making the capsule members 10 and 12 is diagrammatically shown in FIG. 1 and comprises a hopper 18 which contains a supply of grade 4 exfoliated vermiculite. A grade 4 material has a particle size such that all of it will pass through a 10 mesh screen and 90% of it will be caught on a 100 mesh screen. The vermiculite is guided into a power driven mixer 20 which has blades and mixing elements that tumble the vermiculite while a binder of polyvinyl acetate in latex form is pumped from a tank 22 and sprayed into the vermiculite through suitable nozzles 24. The action is such that a homogeneous mixture of vermiculite and binder is discharged onto a conveyor belt 26 which delivers the mix to the hopper 28 of a tableting press 30.

From the lower end of the hopper 28, a charge of the mix is moved into a cavity 32 of the press 30, the bottom of said cavity being formed by the top surface of a cylindrical plunger 34 that projects from a double acting hydraulic power cylinder 36. A second cylindrical plunger 38, which projects from a double-acting hydraulic cylinder 40, overlies the cavity 32 and has a reduced diameter projecting 42 on its lower surface. The actuation of the power cylinders 36 and 40 is so controlled that, starting from the positions shown in FIG. 1, the upper plunger 38 is forced downwardly to enter the cavity 32 and compress the mix therein against the resistance of the stationary plunger 34 to form the capsule member into the configuration shown by members 10 and 12 of FIG. 2. The upper plunger 38 is then raised, followed by the lower plunger 34 which raises the capsule member to a position above the upper edges of the cavity. The capsule member is then removed manually, or by a suitable stripper member, and directed down a chute 44 onto a processing conveyor 46. The capsule members are then dried by subjecting them to a temperature of 140° F. for about 2 hours or to room temperature for about 16 hours.

After the capsule members are dried, a worker drops a single seed S into the recess of one capsule member, places an adhesive, such as polyvinyl acetate, on the surface 15 around the recess, and then inverts a second capsule member and lightly presses it onto the first member to complete the capsule.

The seed bed material for the capsules has been successfully made from a grade No. 4 mix of exfoliated vermiculite and polyvinyl acetate. The material has been compressed into capsules in a hand-operated tableting press marketed by Pharmaceutical Supply Co. of New York, N.Y. under the designation Engler Tableting Press, Model No. A/B. The mix was compressed at a 6:1 compaction ratio and dried so that the final capsule had a composition of 95% vermiculite and 5% binder solids. Mix compressed at a ratio of 4:1 has been found satisfactory but capsules made of mixes at a lower compaction ratio have not always proved sufficiently durable to withstand handling before and during the planting operation. A mix compaction ratio of 8:1 has also been found satisfactory but capsules made of these higher compaction ratios tend to be too hard, impeding the absorption of moisture necessary for germination and impeding the emergence of the seedling.

As seen in FIG. 2, a typical capsule may have a diameter D of ¾", and a height H of ¼", and a capsule cavity that is ¼" in diameter and ⅛" total height $h$.

The polyvinyl acetate binder may be any commonly available latex type.

The capsule of FIG. 3 is identical to the capsule of FIG. 2 except that the outer end walls are convex.

In FIG. 4, an embodiment of the present capsule is shown which includes a lower member 50 that is cylindrical in configuration and has a cylindrical cavity 52. A relatively thin cylindrical cover 54 is secured by adhesive to the lower member 50 to close the cavity. A feature of this embodiment is the provision of a depending frusto-conical pilot portion 55 on the lower side of the cover which is effective to center the cover on the base member 50.

In FIG. 5 an embodiment of the capsule is illustrated which includes a cylindrical base member 57 having a frusto-conical cavity 58. A cover 59 is provided with a depending portion 60 that mates with the walls of the cavity to center the cover. The tapered walls of the cavity facilitate the insertion of the seed S.

In FIG. 6, a capsule is illustrated which includes a lower cylindrical base member 63 having a cylindrical cavity 64 that is closed by a relatively thin cylindrical cover 65.

In the FIG. 7 embodiment of the capsule, a cylindrical base member 70 is provided with a frusto-conical cavity 71 that is closed by a thin cover 72. The cover may be made of paper or plastic or a similar material. The cover is secured to the base by a suitable adhesive, and its function is to close the cavity. As indicated in FIG. 7, the cover may be part of a continuous strip of material which has a plurality of base members 70 secured thereto. The strip may be weakened by perforating, notching, or scoring to facilitate separation into individual capsule elements before or during the planting operation.

In all of the embodiments of FIGS. 3–7, all members of the capsules are preformed of a suitable seed bed material such as vermiculite and a binder, as explained in connection with the embodiment of FIG. 2, except the cover 72 of the embodiment of FIG. 7. Since the shape of the covers and the shape and depth of the base members and cavity vary, a tableting machine having suitable dies and operating characteristics must be used.

It should be noted that in each of the embodiments described above, a seed has been enclosed in a capsule without subjecting the seed to the pressure that was applied in the capsule comprising operation. Also, since the members of each capsule are dried before the seed is put into the cavity, the seed does not come into contact with moisture nor is it subjected to any heat which may be applied to dry the capsule.

It is also a feature of the present invention that the tablets may be colored to attain advantageous conditions for the seed. In one arrangement, the capsule is painted black to increase absorption of the sun and thus raise the temperature in the cavity to increase the rate of seed germination. The black color may be applied by spraying black paint or lamp black on the capsule after it has been completely formed, particularly on the top and bottom surface. Alternately, lamp black or a similar pigmenting material may be incorporated in the vermiculite mix. In the FIG. 7 embodiment, the base can be colored in the manner mentioned above while the cover 72 may be made of a black colored material.

There has thus been provided a durable seed capsule and the method of producing the capsule. The capsule can be handled before and during planting without damage to the capsule or the seed therein. Moreover, the capsule can be formed without subjecting the seed to heat, pressure, or moisture.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a method for forming a water absorbent capsule of expanded vermiculite seed bed material that has been mixed with a liquid binder, compacted and that embodies a seed; the improvement comprising the steps of compressing the mix before the liquid binder has dried, at a compaction ratio of about 4:1 to one of about 6:1, into a tablet body having a flat face that surrounds a shallow recess in the tablet, said recess being formed to a depth less than the thickness of the disc and with a volume that exceeds that of an individual seed to be encapsulated, drying the recessed tablet body after compaction but before insertion of a seed sufficiently to withstand mechanical handling of the tablet body, inserting a seed into the shallow recess of the dried tablet body, and adhering a cover to said tablet body face which closes the recess and retains the seed in the recess without compressing the seed, said cover being formed of the same material and having substantially the same compaction ratio as the tablet body and being not substantially thicker than the tablet body.

2. The method of claim 1, where the compaction ratio is about 4:1.

3. A seed and seed capsule assembly for the planting of individual seeds of the type wherein the capsule is formed of a compacted mixture of exfoliated vermiculite and a binder; the improvement wherein said capsule has a body member in the form of a relatively thin disc having one flat face, the density of the vermiculite of said body member corresponding to that produced by a compaction ratio of about 4:1 to about 6:1, a shallow recess extending in from said flat face of the disc by a depth that is less than the thickness of the disc, a seed in the recess, said recess having a volume that exceeds that of the seed, and a thin, flat cover member for said recess, said assembled capsule being in the form of a disc having thickness that is less than half the major dimension of the disc for insuring rapid disintegration of the disc adjacent the seed when the capsule is planted and watered.

4. The assembly of claim 3, wherein both said capsule body and the cover members are formed of the same material.

5. The assembly of claim 4, wherein said cover and body members are substantially identical in shape with their recesses superposed to form a single cavity for receiving said seed.

References Cited

UNITED STATES PATENTS

| | | | |
|---|---|---|---|
| 1,446,113 | 2/1923 | Blackwell | 47—34 |
| 1,880,136 | 9/1932 | Hickok | 47—37 |
| 1,948,117 | 2/1934 | Kadow | 47—48.5 |
| 2,785,969 | 3/1957 | Clawson | 47—34X |
| 2,836,291 | 5/1958 | Stroop | 47—56UX |
| 3,080,681 | 3/1963 | Merrill et al. | 47—56 |
| 3,112,577 | 12/1963 | Burger | 47—37 |
| 3,284,209 | 11/1966 | Kelley | 47—56UX |

FOREIGN PATENTS

| | | |
|---|---|---|
| 107,958 | 6/1927 | Austria. |
| 92,046 | 12/1921 | Switzerland. |

ROBERT E. BAGWILL, Primary Examiner